United States Patent
Kano et al.

(10) Patent No.: US 10,923,711 B2
(45) Date of Patent: Feb. 16, 2021

(54) LITHIUM SECONDARY BATTERY INCLUDING NONAQUEOUS ELECTROLYTE HAVING LITHIUM-ION CONDUCTIVITY

(71) Applicant: Panasonic Intellectual Property Management Co., Ltd., Osaka (JP)

(72) Inventors: Akira Kano, Osaka (JP); Ryohei Miyamae, Osaka (JP); Kiyohiro Isii, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 51 days.

(21) Appl. No.: 16/391,370

(22) Filed: Apr. 23, 2019

(65) Prior Publication Data

US 2019/0372092 A1    Dec. 5, 2019

(30) Foreign Application Priority Data

May 31, 2018   (JP) .................. 2018-105705

(51) Int. Cl.
  H01M 4/131    (2010.01)
  H01M 4/134    (2010.01)
  (Continued)

(52) U.S. Cl.
  CPC .......... H01M 4/131 (2013.01); H01M 4/134 (2013.01); H01M 4/661 (2013.01); H01M 4/70 (2013.01);
  (Continued)

(58) Field of Classification Search
  CPC ...... H01M 4/131; H01M 4/134; H01M 4/661; H01M 4/70; H01M 10/0525;
  (Continued)

(56) References Cited

U.S. PATENT DOCUMENTS 5,162,178 A * 11/1992 Ohsawa ................ H01M 4/045
                                                              429/213
8,962,190 B1    2/2015 Gross et al.
(Continued)

FOREIGN PATENT DOCUMENTS

CN    207303231 U    5/2018
JP    2001-243957    9/2001
(Continued)

OTHER PUBLICATIONS

The Extended European Search Report dated Oct. 30, 2019 for the related European Patent Application No. 19168342.4.

*Primary Examiner* — Michael L Dignan
(74) *Attorney, Agent, or Firm* — McDermott and Will and Emery LLP

(57) ABSTRACT

A lithium secondary battery comprises an electrode group and a nonaqueous electrolyte having lithium-ion conductivity. A negative electrode current collector has a first surface facing outward of winding of the electrode group and a second surface facing inward of the winding of the electrode group. At least the first surface or the second surface includes a first region and a second region that is closer to an innermost circumference of the winding of the electrode group than the first region. Protrusions include outer-circumference-side protrusions disposed on the first region and inner-circumference-side protrusions disposed on the second region. In at least the first surface or the second surface, a first area rate is smaller than a second area rate.

17 Claims, 6 Drawing Sheets

(51) Int. Cl.
*H01M 4/66* (2006.01)
*H01M 4/70* (2006.01)
*H01M 10/0525* (2010.01)
*H01M 10/0565* (2010.01)
*H01M 4/02* (2006.01)

(52) U.S. Cl.
CPC ... *H01M 10/0525* (2013.01); *H01M 10/0565* (2013.01); *H01M 2004/027* (2013.01); *H01M 2004/028* (2013.01)

(58) Field of Classification Search
CPC ....... H01M 10/0565; H01M 2004/027; H01M 2004/028; H01M 10/0587; H01M 10/052; H01M 6/78
See application file for complete search history.

(56) References Cited

U.S. PATENT DOCUMENTS

| | | | | |
|---|---|---|---|---|
| 2002/0122975 | A1* | 9/2002 | Spillman | H01M 10/0587 429/128 |
| 2005/0074671 | A1* | 4/2005 | Sugiyama | H01M 4/661 429/231.95 |
| 2006/0110661 | A1* | 5/2006 | Lee | H01M 4/661 429/233 |
| 2009/0317721 | A1* | 12/2009 | Shirane | H01M 4/1395 429/231.95 |
| 2010/0167111 | A1* | 7/2010 | Sumihara | H01M 4/72 429/94 |
| 2011/0111277 | A1* | 5/2011 | Bessho | H01M 4/661 429/94 |
| 2013/0011742 | A1* | 1/2013 | Park | H01M 4/661 429/234 |
| 2013/0022864 | A1 | 1/2013 | Uchida et al. | |
| 2015/0125756 | A1* | 5/2015 | Kim | H01M 4/661 429/243 |
| 2015/0280212 | A1 | 10/2015 | Son et al. | |
| 2015/0311501 | A1* | 10/2015 | Tenzer | H01M 4/0445 429/231.95 |
| 2016/0013462 | A1* | 1/2016 | Cui | H01M 4/134 429/126 |

FOREIGN PATENT DOCUMENTS

| | | |
|---|---|---|
| JP | 2006-156351 | 6/2006 |
| JP | 2016-527680 | 9/2016 |

* cited by examiner

OW

IW

LITHIUM SECONDARY BATTERY INCLUDING NONAQUEOUS ELECTROLYTE HAVING LITHIUM-ION CONDUCTIVITY

BACKGROUND

1. Technical Field

The present disclosure relates to a lithium secondary battery including a nonaqueous electrolyte having lithium ion-conductivity.

2. Description of the Related Art

Nonaqueous electrolyte secondary batteries are used in, for example, information and communication technologies (ICT), such as personal computers and smart phones, cars, and power storage. In these uses, the nonaqueous electrolyte secondary batteries are required to have further higher capacities. As high-capacity nonaqueous electrolyte secondary batteries, lithium-ion batteries are known. The capacity of a lithium-ion battery can be increased by using, for example, a combination of graphite and an alloy active material, such as a silicon compound, as the negative electrode active material. However, the increase in the capacity of a lithium-ion battery is reaching a limit.

Lithium secondary batteries are promising as nonaqueous electrolyte secondary batteries having a capacity higher than that of lithium-ion batteries. In lithium secondary batteries, lithium metal is deposited on the negative electrode during charging, and this lithium metal is dissolved in a nonaqueous electrolyte during discharging.

In lithium secondary batteries, it has been investigated to improve, for example, the shape of the negative electrode current collector from the viewpoint of reducing deterioration of the battery characteristics by deposition of lithium metal in a dendrite form. For example, Japanese Unexamined Patent Application Publication No. 2001-243957 (PTL 1) proposes to control the ten-point average roughness Rz of the lithium metal deposition surface of the negative electrode current collector to 10 μm or less. Japanese Unexamined Patent Application Publication (Translation of PCT Application) No. 2016-527680 (PTL 2) proposes a lithium secondary battery using a negative electrode including a porous metal current collector and lithium metal inserted into the pores of the current collector. Japanese Unexamined Patent Application Publication No. 2006-156351 (PTL 3) proposes a lithium metal polymer secondary battery using a negative electrode current collector having a surface provided with a plurality of recesses having a prescribed shape.

SUMMARY

One non-limiting and exemplary embodiment provides a lithium secondary battery including a wound electrode group having excellent cycle characteristics.

In one general aspect, the techniques disclosed here feature a lithium secondary battery comprising an electrode group and a nonaqueous electrolyte having lithium-ion conductivity. The electrode group includes a positive electrode, a negative electrode, and a separator disposed between the positive electrode and the negative electrode. The positive electrode contains a positive electrode active material containing lithium. The negative electrode includes a negative electrode current collector and protrusions disposed on the negative electrode current collector. The positive electrode, the negative electrode, and the separator of the electrode group are wound. Lithium metal is deposited on the negative electrode during charging, and the lithium metal is dissolved in the nonaqueous electrolyte during discharging. The negative electrode current collector has a first surface facing outward of the winding of the electrode group and a second surface facing inward of the winding of the electrode group. At least the first surface or the second surface includes a first region and a second region that is closer to an innermost circumference of the winding of the electrode group than the first region. The protrusions include outer-circumference-side protrusions disposed on the first region and inner-circumference-side protrusions disposed on the second region. In at least the first surface or the second surface, a first area rate is smaller than a second area rate. The first area rate refers to $(A_{OP}/A_O) \times 100\%$. $A_{OP}$ refers to a sum of the projection areas of the outer-circumference-side protrusions onto the first region. $A_O$ refers to an area of the first region. The second area rate refers to $(A_{IP}/A_I) \times 100\%$. $A_{IP}$ refers to a sum of the projection areas of the inner-circumference-side protrusionson to the second region. $A_I$ refers to an area of the second region.

According to embodiments of the present disclosure, in a lithium secondary battery including a wound electrode group, cycle characteristics can be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
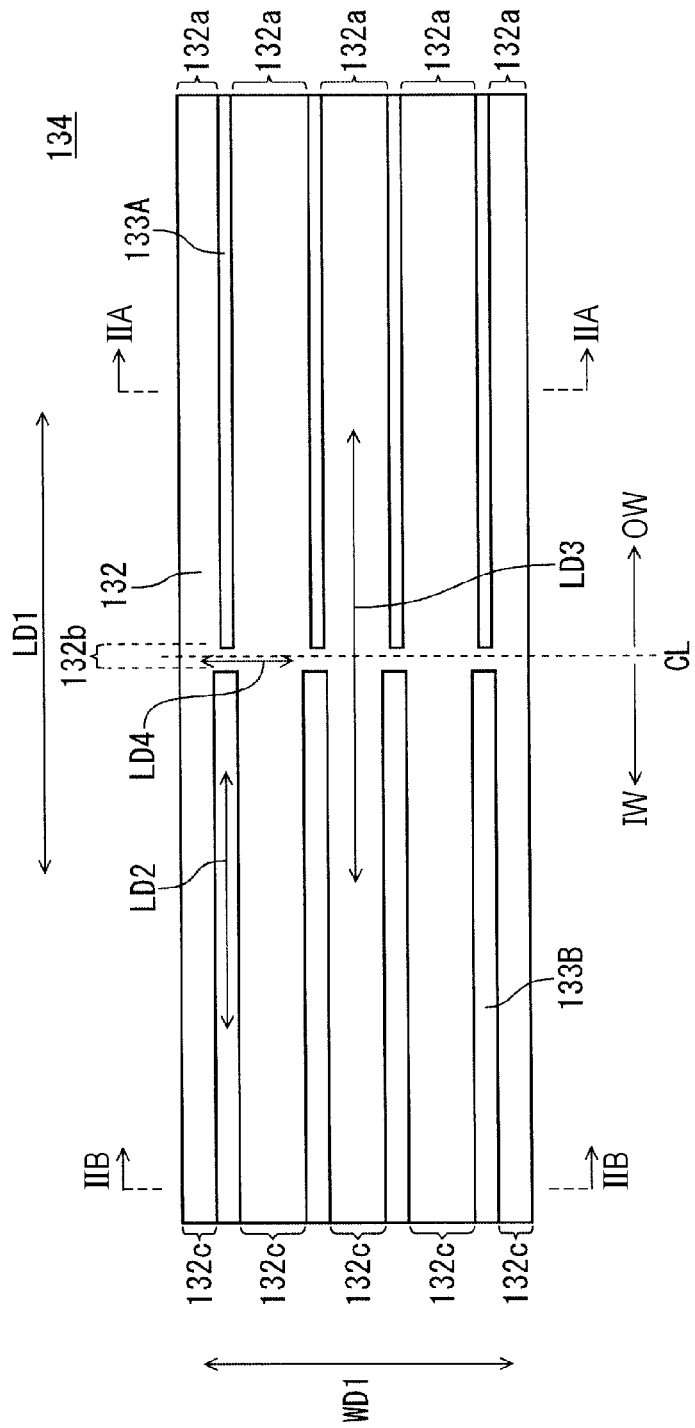
FIG. 1 is a plan view schematically illustrating a negative electrode used in a lithium secondary battery according to an embodiment of the present disclosure.

Underlying Knowledge Forming Basis of the Present Disclosure

An embodiment of the present disclosure relates to a lithium secondary battery using lithium metal as a negative electrode active material and including a wound electrode group. More specifically, the embodiment of the present disclosure relates to an improvement of the negative electrode current collector in the wound electrode group. Lithium secondary batteries are also called lithium-metal secondary batteries. In lithium secondary batteries, lithium metal may be deposited in a dendrite form at the negative electrode during charging. Furthermore, generation of dendrites increases the specific surface area of the negative electrode, which may increase a side reaction. Accordingly, the discharge capacity or charge-discharge efficiency decreases, which tends to reduce the cycle characteristics. Regarding this, PTL 1 teaches that the generation of dendrites is reduced by controlling the ten-point average roughness Rz of the lithium metal deposition surface of the negative electrode to 10 µm or less to give a high charge-discharge efficiency.

In addition, in lithium secondary batteries, since lithium metal is deposited on the negative electrode during charging, the amount of expansion of the negative electrode is particularly apt to increase. In the present specification, the term "expansion of negative electrode" means that the sum of the volume of the negative electrode and the volume of deposited lithium metal is increased. In particular, when lithium metal is deposited in a dendrite form, the amount of expansion is further increased. In a cylindrical lithium battery including a wound electrode group, a stress is generated by excessive expansion of the negative electrode. In order to absorb the change in the volume of the negative electrode by charge and discharge, PTL 2 proposes use of, for example, a porous copper or nickel negative electrode current collector having a pore rate of 50% to 99% and a pore size of 5 to 500 µm. In the negative electrode current collector of PTL 3, recesses are provided for securing spaces for forming lithium metal in a dendrite form.

The stress caused by deposition of lithium metal is released from, for example, the main surface and the side surface of the negative electrode in a coin-shaped electrode group, and the stress is released from, for example, the end of the negative electrode in a laminated electrode group. In contrast, in a wound electrode group, the stress caused by deposition of lithium metal is a tensile strain in the circumferential direction in a cross section perpendicular to the winding axis of the electrode group. In the wound electrode group, the stress caused by deposition of lithium metal is less likely released from the inner circumference side of the electrode group and the end of the negative electrode, and therefore the stress heads for the outer circumference side of the electrode group. In addition, when the winding end of the wound electrode group is fixed with tape and is surrounded by a battery case, a stress is also applied from the outside. Thus, in a wound electrode group, the stress is less likely dispersed, compared to other electrode groups such as coin-shaped or laminated electrode groups, and excessive expansion or uneven expansion of the negative electrode tends to occur.

In the present specification, the negative electrode current collector of the wound electrode group includes a first surface facing outward of the winding of the electrode group and a second surface facing inward of the winding of the electrode group. That is, the first surface faces the direction going away from the winding axis of the electrode group with respect to the negative electrode current collector, and the second surface faces the direction approaching the winding axis of the electrode group with respect to the negative electrode current collector. Hereinafter, in a negative electrode current collector, the side facing outward of the winding of the electrode group may be referred to as the outside, and the side facing inward of the winding of the electrode group may be referred to as the inside. If at least outer surface or the inner surface of the negative electrode current collector includes a first region and a second region that is closer to the innermost circumference of the winding of the electrode group than the first region, in the electrode group, the portion including the first region is referred to as the outer winding portion, and the portion including the second region is referred to as the inner winding portion.

The pressure applied to the surface of the negative electrode current collector by the stress heading for the outer circumference side as described above and the stress from the outside of the electrode group is higher at the outer winding portion than that at the inner winding portion of the electrode group. Hereinafter, the pressure applied to the surface of the negative electrode current collector may be referred to as surface pressure. In the wound electrode group, as described above, large stress and surface pressure are applied to the outer winding portion of the electrode group. Accordingly, the pressure applied to the lithium metal deposited on the negative electrode surface at the outer winding portion is larger than that applied to the lithium metal deposited on the negative electrode surface of the inner winding portion. Due to this large pressure, the lithium metal deposited on the negative electrode surface is compressed in the outer winding portion of the electrode group.

Due to such differences in the stress and surface pressure between the inner winding portion and the outer winding portion of the electrode group, the density of lithium metal deposited on the outer winding portion is larger than that of lithium metal deposited on the inner winding portion. In the wound electrode group, this difference in the density makes the charge-discharge reaction heterogeneous. Heterogeneous charge-discharge reaction tends to cause excessive expansion of the negative electrode and/or deterioration in the charge-discharge efficiency to decrease the cycle life.

In the negative electrode current collector of PTL 2 or PTL 3, lithium metal is deposited in the spaces of pores or recesses by charging. In PTL 2 and PTL 3, basically, laminated or coin-shaped electrode groups are supposed. Accordingly, the pressure generated in the electrode group is less likely applied to the lithium metal in the pores or the recesses. Accordingly, in the pores or the recesses, the lithium metal tends to peel off from the wall surface of the current collector. The peeled lithium metal cannot be dissolved during discharging, and therefore the charge-discharge efficiency is decreased. Since a pressure is less likely applied to the lithium metal in the pores or the recesses, it is difficult to sufficiently reduce the expansion of the negative electrode during charging. Even if the negative electrode current collector of PTL 2 or PTL 3 is used in a wound electrode group, uneven deformation tends to occur by winding. Consequently, the charge-discharge reaction becomes heterogeneous. Therefore, it is difficult to actually reduce the deterioration in the cycle characteristics.

The present inventors diligently studied to solve the above-mentioned problems and, as a result, arrived at the lithium secondary battery according to the present disclosure. The lithium secondary battery according to one aspect of the present disclosure comprises an electrode group and a lithium ion conductive nonaqueous electrolyte. The electrode group includes a positive electrode, a negative electrode, and a separator disposed between the positive electrode and the negative electrode. The positive electrode includes a positive electrode active material containing lithium. The negative electrode includes a negative electrode current collector and protrusions disposed on the negative electrode current collector. The positive electrode, the negative electrode, and the separator are wound. Lithium metal is deposited on the negative electrode during charging, and the lithium metal is dissolved in the nonaqueous electrolyte during discharging. The protrusions include outer-circumference-side protrusions present in the outer winding portion of the electrode group and inner-circumference-side protrusions present in the inner winding portion of the electrode group. The first area rate of the outer-circumference-side protrusions to the outer winding portion is smaller than the second area rate of the inner-circumference-side protrusions to the inner winding portion.

In the present disclosure, the "first area rate of the outer-circumference-side protrusions to the outer winding portion" means the rate $(A_{OP}/A_O) \times 100\%$ of the sum $(A_{OP})$ of projection areas of the outer-circumference-side protrusions onto the first region to the area $(A_O)$ of the first region in the first or second surface of the negative electrode current collector. The "second area rate of the inner-circumference-side protrusions to the inner winding portion" means the rate $(A_{IP}/A_I) \times 100\%$ of the sum $(A_{IP})$ of the projection areas of the inner-circumference-side protrusions onto the second region to $(A_I)$ the area of the second region in the first or second surface of the negative electrode current collector.

According to the above-described aspect of the present disclosure, in the wound electrode group, a negative electrode including a negative electrode current collector and protrusions disposed on the negative electrode current collector is used. The protrusions can secure spaces for depositing lithium metal at the negative electrode, and therefore the change in the apparent volume of the negative electrode caused by deposition of lithium metal can be decreased. In the present specification, the term "apparent volume of a negative electrode" means the total volume of the negative electrode, the deposited lithium metal, and the spaces secured by the protrusions.

Furthermore, the first area rate of the outer-circumference-side protrusions to the outer winding portion is controlled to be smaller than the second area rate of the inner-circumference-side protrusions to the inner winding portion. Consequently, the stress caused by deposition of lithium metal can be reduced from concentrating in the lithium metal deposited on the outer circumference side. Consequently, the difference in the density of lithium metal between the outer winding portion and the inner winding portion can be decreased. In addition, the surface pressure of the negative electrode surface in the outer winding portion can be reduced from excessively increasing. Thus, in the outer winding portion and the inner winding portion of the electrode group, the differences in the density of lithium metal and the surface pressure are decreased to make the charge-discharge reaction more homogeneous. As a result, deterioration in the capacity can be reduced even if charge and discharge are repeated, and the cycle characteristics can be improved.

Since the electrode group is a winding type, a certain degree of pressure is applied to the lithium metal deposited in the space in the negative electrode. Accordingly, the lithium metal deposited in the space is less likely peeled off, unlike the cases of PTL 2 and PTL 3. Consequently, deterioration of the charge-discharge efficiency can also be reduced. In addition, since an appropriate pressure is applied to the deposited lithium metal, the deposition itself of lithium metal in a dendrite form can be reduced even if the negative electrode is not smoothened, unlike the case of PTL 1.

For example, in each of the outer surface and the inner surface (i.e., the first surface and the second surface) of the negative electrode current collector, the region facing the positive electrode active material is divided into two portions by the center line in the longitudinal direction of the region. Furthermore, for example, the portion far from the innermost circumference of the winding of the electrode group than the center line is defined as a first region located in the outer winding portion of the electrode group, and the portion closer to the innermost circumference of the winding of the electrode group than the center line is defined as a second region located in the inner winding portion of the electrode group.

The negative electrode current collector usually includes a first surface and a second surface which is on the opposite side of the first surface. The first surface and the second surface mean two main surfaces of, for example, a sheet-like negative electrode current collector. The outer-circumference-side protrusions and the inner-circumference-side protrusions are disposed on at least the first surface side or the second surface side. The first surface may be the outer surface of the negative electrode current collector. The second surface may be the inner surface of the negative electrode current collector. From the viewpoint of capable of securing spaces for deposition of lithium metal during charging on the first surface and the second surface of the negative electrode current collector and in the vicinities thereof, the outer-circumference-side protrusions may include first protrusions disposed on the first surface side and second protrusions disposed on the second surface side, and the inner-circumference-side protrusions may include first protrusions disposed on the first surface side and second protrusions disposed on the second surface side. The first protrusions protrude from the first surface side of the negative electrode current collector toward the surface of the separator facing the first surface. The second protrusions protrude from the second surface side of the negative electrode current collector toward the surface of the separator facing the second surface.

In this case, the outer-circumference-side protrusions are protrusions disposed on the outer circumference side first surface and the outer circumference side second surface located in the outer winding portion (i.e., the first region of the first surface and the first region of the second surface). The first area rate may be the average of the area rate (an example of a third area rate $(A_{O1P}/A_{O1}) \times 100\%$) of the total projection area (an example of a sum $A_{O1P}$) of the protrusions disposed on the outer circumference side first surface onto the outer circumference side first surface to the area (an example of an area $A_{O1}$) of the outer circumference side first surface and the area rate (an example of a fourth area rate $(A_{O2P}/A_{O2}) \times 100\%$) of the total projection area (an example of a sum $A_{O2P}$) of the protrusions disposed on the outer circumference side second surface onto the outer circumference side second surface to the area (an example of an area $A_{O2}$) of the outer circumference side second surface. The inner-circumference-side protrusions are protrusions disposed on the inner circumference side first surface and the inner circumference side second surface located in the inner winding portion (i.e., the second region of the first surface and the second region of the second surface). The second area rate may be the average of the area rate (an example of a fifth area rate $(A_{I1P}/A_{I1}) \times 100\%$) of the total projection area (an example of a sum $A_{I1P}$) of the protrusions disposed on the inner circumference side first surface onto the inner circumference side first surface to the area (an example of an area $A_{I1}$) of the inner circumference side first surface and the area rate (an example of a sixth area rate $(A_{I2P}/A_{I2}) \times 100\%$) of the total projection area (an example of a sum $A_{I2P}$) of the protrusions disposed on the inner circumference side second surface to the area (an example of an area $A_{I2}$) of the inner circumference side second surface.

Hereinafter, the total area of projection shapes (i.e., projection areas) obtained by projecting the protrusions onto the surface of the negative electrode current collector on which the protrusions are disposed may be referred to as the area of the protrusions. The projection shapes of protrusions onto the surface of the negative electrode current collector are the shapes formed when the protrusions are projected onto the surface of the negative electrode current collector on the side on which the protrusions are formed in the thickness direction of the negative electrode current collector. Although some layer may be formed between the negative electrode current collector and the protrusions, the projection shapes or the projection areas may be determined by assuming that the protrusions are projected onto the surface of the negative electrode current collector. The area of each of the first and second regions and the areas of protrusions may be determined from the negative electrode in a state where the first surface and the second surface are planarly spread. The negative electrode before being formed into a wound electrode group may be used for determining each area. When the protrusions are linear as described below and are aligned in substantially parallel to each other, the rate of the area of the protrusions can also be estimated from the clearance between two adjacent protrusions and the width of the protrusions.

However, in the calculation of the first area rate and the second area rate, it is not necessary to consider the region of the surface of the negative electrode current collector not facing the positive electrode active material. That is, the first and second regions do not include the region of the surface of the negative electrode current collector not facing the positive electrode active material. Accordingly, the area of the first and second regions does not include the area of the region of the surface of the negative electrode current collector not facing the positive electrode active material. In the wound electrode group, for example, there are cases in which in the outermost circumference of the winding, a region on the outside of the negative electrode current collector does not face the positive electrode active material. In such a case, since lithium metal is less likely deposited on the region on the outside not facing the positive electrode active material, the region is not considered in the calculation of the first area rate. Similarly, there are cases in which in the innermost circumference of the winding, a region on the inside of the negative electrode current collector does not face the positive electrode active material. In this case, since lithium metal is less likely deposited on the region on the inside not facing the positive electrode active material, the region is not considered in the calculation of the second area rate.

When the width of the negative electrode current collector in the direction parallel to the winding axis is larger than the width of the positive electrode current collector, at the upper end and/or the lower end (i.e., one end portion and/or the other end portion in the direction parallel to the winding axis) of the electrode group, a band-shaped region of the negative electrode current collector extending in the longitudinal direction perpendicular to the winding axis does not face the positive electrode active material. In this case, the band-shaped region is not considered in the calculation of each area rate. The longitudinal direction of the region of the negative electrode current collector facing the positive electrode active material is parallel to the longitudinal direction of the negative electrode current collector. In each of the first surface and the second surface of the negative electrode current collector, the direction perpendicular to the winding axis of the electrode group is defined as the longitudinal direction of the negative electrode current collector, and the direction parallel to the winding axis is defined as the width direction of the negative electrode current collector. Hereinafter, the longitudinal direction of the negative electrode current collector is referred to as the first longitudinal direction, and the width direction is referred to as the first width direction. More specifically, on both ends of the negative electrode current collector in the longitudinal direction, the line connecting the midpoints in the width direction is defined as the first center line, and the direction of the first center line is defined as the first longitudinal direction. The direction perpendicular to the first longitudinal direction is defined as the first width direction.

The difference between the first area rate and the second area rate can be adjusted according to, for example, the energy density and the size of the battery, as long as the first area rate is smaller than the second area rate. The difference between the first area rate and the second area rate may be 3 percentage points or more and 5 percentage points or more. When the difference is within such a range, since the difference in the stress between the outer winding portion and the inner winding portion of the electrode group tends to be further relaxed, the effect of homogenizing the charge-discharge reaction can be further enhanced. The difference between the first area rate and the second area rate is, for example, 50 percentage points or less and may be 20 percentage points or less. When the difference is within such a range, since a space having a volume suitable for the magnitude of the stress and the deposition amount of lithium tends to be secured, a high capacity tends to be secured while maintaining high cycle characteristics. The difference between the first area rate and the second area rate is the value obtained by subtracting the second area rate from the first area rate.

The first area rate and the second area rate may each be 0.2% or more, 1% or more, or 3% or more. When the rates are within such ranges, the separator can be readily supported by the protrusions, and the distance between the negative electrode current collector and the separator can be readily made constant. Accordingly, the effect of homogeneously performing the charge-discharge reaction can be enhanced. It is also possible to further enhance the effect of reducing expansion of the negative electrode. The first area rate and the second area rate may each be 70% or less or 50% or less. When the rates are within such ranges, since a space tends to be secured between the surface of the negative electrode current collector and the separator, a high capacity can be secured while reducing the expansion of the negative electrode caused by deposition of lithium metal. These lower limit value and upper limit value can be arbitrarily combined.

A structure of the lithium secondary battery according to the above-described aspect will now be more specifically described with reference to the drawings as appropriate. First of all, the structure of the negative electrode will be described.

Negative Electrode

The negative electrode includes a negative electrode current collector and protrusions disposed on the negative electrode current collector. The negative electrode current collector usually includes a first surface and a second surface on the opposite side of the first surface. The first surface and the second surface are the outer surface and the inner surface, respectively, of the negative electrode current collector in a wound electrode group. In the negative electrode of a lithium secondary battery, lithium metal is deposited by charging. More specifically, lithium ions contained in a nonaqueous electrolyte receive electrons on the negative electrode by charging and are converted into lithium metal to be deposited on the surface of the negative electrode. The deposited lithium metal is dissolved as lithium ions in the nonaqueous electrolyte by discharging. The lithium ions contained in the nonaqueous electrolyte may be derived from a lithium salt added to the nonaqueous electrolyte, may be supplied from the positive electrode active material by charging, or may be both.

The negative electrode can secure a space for accommodating the lithium metal deposited on the surface of the negative electrode by having protrusions. Accordingly, the space can reduce expansion of the negative electrode caused by deposition of lithium metal. In addition, the first area rate of the outer-circumference-side protrusions to the outer winding portion is controlled to be smaller than the second area rate of the inner-circumference-side protrusions to the inner winding portion. Consequently, as described above, since the difference in the density of deposited lithium metal and the difference in the surface pressure between the outer winding portion and the inner winding portion of the electrode group can be decreased, the charge-discharge reaction becomes more homogeneous. In addition, deterioration of the charge-discharge efficiency can be reduced. Accordingly, the cycle characteristics can be improved.

The heights of the outer-circumference-side protrusions and the inner-circumference-side protrusions (hereinafter, may be simply referred to as protrusions) can be respectively determined according to the positions where the protrusions are formed and the deposition amount of lithium metal. The average height of the outer-circumference-side protrusions may be 15 µm or more, 20 µm or more, or 30 µm or more. Furthermore, the average height of the outer-circumference-side protrusions may be 40 µm or more or 50 µm or more. The average height of the inner-circumference-side protrusions may be 15 µm or more, 20 µm or more, or 30 µm or more. Furthermore, the average height of the inner-circumference-side protrusions may be 40 µm or more or 50 µm or more. When the average height is within such a range, the effect of absorbing a large stress applied to the outer winding portion and the effect of absorbing the change in the volume of the negative electrode caused by deposition of lithium metal can be further enhanced. The effect of reducing damage of the electrode can also be enhanced.

The average height of the outer-circumference-side protrusions may be 120 µm or less or 110 µm or less. Furthermore, the average height of the outer-circumference-side protrusions may be 100 µm or less or 90 µm or less. The average height of the inner-circumference-side protrusions may be 120 µm or less or 110 µm or less. Furthermore, the average height of the inner-circumference-side protrusions may be 100 µm or less or 90 µm or less. When the average height is within such a range, the separator appropriately presses the lithium metal deposited on the negative electrode surface to increase the conductivity between the lithium metal and the negative electrode current collector, resulting in enhancement in the charge-discharge efficiency. In addition, excessive pressing on the protrusions by the separator is reduced to protect the electrode. These lower limit value and upper limit value can be arbitrarily combined.

In terms of ease of manufacturing, the difference between the first average height of the outer-circumference-side protrusions and the second average height of the inner-circumference-side protrusions may be less than 3% of the second average height. That is, the average heights of the outer-circumference-side protrusions and the inner-circumference-side protrusions may be substantially the same. From a similar viewpoint, the difference between the average height of the first protrusions and the average height of the second protrusions may be less than 3% of the average height of the second protrusions. That is, the average heights of the first protrusions and the second protrusions may be substantially the same.

The average height of protrusions can be determined by, for example, arbitrarily selecting three protrusions in a cross-section photograph of the negative electrode in the thickness direction, measuring the distance from the end of each of the selected protrusions on the negative electrode current collector side to the end of the protrusion on the side opposite to the negative electrode current collector as the height of each protrusion, and averaging the heights of these protrusions. Alternatively, the first average height may be determined by cutting out a certain area (e.g., 5 $cm^2$) or a plurality of arbitrary regions in the first region of the negative electrode current collector and averaging the heights of a plurality of arbitrary protrusions present in the certain area or the arbitrary regions. In such a case, the first average height may be determined by taking a plurality of cross-section photographs in a certain area or a plurality of arbitrary regions, measuring the height of each protrusion in these cross-section photographs, and averaging the heights of the protrusions. The protrusions as the measurement object may be disposed over the entire surface of the first region or may be disposed only in a very small portion.

In measurement of the average height of protrusions, when the end of each protrusion on the negative electrode current collector side and/or the other end on the opposite side is not flat, the maximum value of the length between both ends of each protrusion in the direction parallel to the thickness direction of the negative electrode is defined as the height of each protrusion. In addition, in measurement of the average height of protrusions, when protrusions are formed on both the first surface and the second surface of the negative electrode current collector, three protrusions are arbitrarily selected from the protrusions formed on both the first surface and the second surface. Each of the average heights may be determined based on a cross-section photograph of the electrode group that allows observation of the cross-section in the thickness direction of the negative electrode.

When the first surface and/or the second surface is rough, the surface roughness Rz of the first surface and/or the second surface may be 1 µm or less. Each height of the protrusions on the first surface and/or the second surface may be higher than 1 µm. When the first surface and/or the second surface is rough and the protrusions and the negative electrode current collector are integrally made of the same material, each height of the protrusions on the first surface and/or the second surface may be measured based on the bottom of the rough. In this case, the height is measured in a state in which the first surface and the second surface are extended to be flat by unwinding the electrode group.

A least a part of the protrusions may be in contact with the separator. For example, the first protrusions may be in contact with the surface of the separator facing the first surface. The second protrusions may be in contact with the surface of the separator facing the second surface. The presence of protrusions secures a space between the negative electrode and the separator. In such a case, lithium metal is deposited by charging in the space formed between the negative electrode current collector and the separator. The influence of the relationship between the first area rate and the second area rate is remarkably exhibited by the contact between the protrusions and the separator, and in the outer winding portion and the inner winding portion of the electrode group, it is possible to press the deposited lithium metal by a pressure suitable for the respective regions. In addition, since the deposition of lithium metal is reduced at the portion where each protrusion is in contact with the separator, such as the tip of the protrusion, it is also possible to reduce local expansion of the negative electrode.

From the viewpoint of further enhancing the effect of improving cycle characteristics, in each of the first surface and the second surface of the negative electrode current collector, 80% or more of the total projection area of the protrusions onto the surface of the negative electrode current collector may be in contact with the separator. From the same viewpoint, all of the protrusions formed on each of the first surface and the second surface may be in contact with the separator. The projection shape of each of the protrusions onto the surface of the negative electrode current collector is not particularly limited. From the viewpoint of easily supporting the separator and easily supplying a nonaqueous electrolyte to the vicinity of an electrode, the projection shape of each of the protrusions onto the surface of the negative electrode current collector may be a line shape. The term "line shape" includes a strip shape. The strip shape refers to a line shape having a relatively short length.

From the viewpoint of securing a space having an appropriate volume for accommodating deposited lithium metal, in the direction parallel to the surface of the negative electrode, two adjacent protrusions of the protrusions may be spaced to some extent. For example, the minimum clearance between two adjacent protrusions may be larger than the maximum width of the two adjacent protrusions. The minimum clearance between two adjacent protrusions means the smallest distance between outer edges of the projection shapes of two adjacent protrusions arbitrarily selected from protrusions when the two adjacent protrusions are projected onto the surface of the negative electrode current collector on the side on which the protrusions are formed in the thickness direction of the negative electrode current collector. The maximum width of two adjacent protrusions is the maximum value of the width (the length in the direction perpendicular to the longitudinal direction of the protrusions) of the projection shapes of the two adjacent protrusions onto the surface of the negative electrode current collector on the side on which the protrusions are formed. When the projections have circular shapes, the larger one of the diameters of the projection shapes of two protrusions is defined as the maximum width.

In each of the first surface and the second surface of the negative electrode current collector, the projection shapes of the protrusions onto the surface of the negative electrode current collector may be each a line shape, and the protrusions may be aligned approximately parallel to each other in the longitudinal direction. In such a case, the minimum clearance between two adjacent protrusions may be larger than the maximum width of the two adjacent protrusions. In such a case, the separator is readily supported by the protrusions, and a space having an appropriate volume tends to be secured between two adjacent protrusions. Hereinafter, the longitudinal direction of each protrusion of which the projection shape is line like is referred to as the second longitudinal direction. More specifically, on two ends in the longitudinal direction of a protrusion of which the projection shape is line like, the center line connecting the midpoints in the respective width directions is defined as the second center line, and the direction of the second center line is defined as the second longitudinal direction.

The state in which the protrusions are aligned approximately parallel to each other in the second longitudinal direction refers to a case in which the protrusions are parallel to each other in the second longitudinal direction or the acute angle formed by the second longitudinal directions of the protrusions is 30° or less. The longitudinal direction of the projection shape formed by projecting each protrusion onto the surface of the negative electrode current collector on which the protrusion is formed in the thickness direction of the negative electrode current collector is defined as the second longitudinal direction of each protrusion.

The minimum clearance is not limited as long as the value is larger than the minimum width of the protrusions and may be 150% or more, 400% or more, or 500% or more the minimum width. The minimum clearance may be 3000% or less of the minimum width of the protrusions.

When line-shaped protrusions are aligned approximately parallel to each other, the clearance between the protrusions may be determined from the center-to-center distance of two adjacent protrusions and the width of each protrusion. The center of a protrusion in this case refers to the second center line of the protrusion. The distance between the second center lines of two adjacent protrusions may be defined as the center-to-center distance.

In order to make the nonaqueous electrolyte easily penetrate into the inside of the electrode group, in the first surface and/or the second surface, no continuous frame-like protrusion surrounding the entire or a part of each surface may be formed. In the periphery of the first surface and/or the second surface, no continuous frame-like protrusion surrounding most of each surface may be formed. When a continuous frame-like protrusion is not formed, the nonaqueous electrolyte tends to penetrate into the inside from the portion where no protrusions are formed, and the separator tends to become into contact with the deposited lithium metal. Accordingly, the effect of reducing uneven deposition of lithium metal is enhanced, and therefore generation of dendrites can be reduced and deterioration in the charge-discharge efficiency can be reduced.

The first surface and/or the second surface may include a band-shaped region where no protrusions are formed along at least one the first longitudinal direction or the first width direction. Each surface may include at least one band-shaped region or may include two or more band-shaped regions. In such a case, the nonaqueous electrolyte tends to penetrate into the inside of the electrode group through the band-shaped region. Since the nonaqueous electrolyte can be easily held between the positive electrode and the negative electrode, deposition and dissolution of lithium metal smoothly progress to reduce deterioration of the capacity and the charge-discharge efficiency. In addition, in the band-shaped region, the separator tends to come into contact with the deposited lithium metal. Consequently, since the effect of reducing uneven deposition of lithium metal is enhanced, generation of dendrites can be reduced.

The band-shaped region may be formed along the first longitudinal direction or the first width direction. In the first surface and/or the second surface, the negative electrode current collector may have a band-shaped region (first band-shaped region) along one of the first longitudinal direction and the first width direction and a band-shaped region (second band-shaped region) along the other direction. From the viewpoint of allowing the nonaqueous electrolyte to easily penetrate further into the inner circumference side of the wound electrode group and easily securing a high capacity and a high charge-discharge efficiency, a first band-shaped region may be provided along the first longitudinal direction. The first band-shaped region is easily formed by providing protrusions whose projection shapes onto each surface of the negative electrode current collector are line shapes on each surface. In particular, the first band-shaped region is easily formed between two adjacent protrusions in the first width direction by providing protrusions such that the protrusions are approximately parallel to the first longitudinal direction in the second longitudinal direction.

The expression "a first band-shaped region is provided along the first longitudinal direction" means that a band-shaped region where no protrusions are formed is present on the negative electrode current collector in a direction approximately parallel to the first longitudinal direction. The expression "a second band-shaped region is provided along the first width direction" means that a band-shaped region where no protrusions are formed is present on the negative electrode current collector in a direction approximately parallel to the first width direction.

Hereinafter, the longitudinal direction of the first band-shaped region is referred to as the third longitudinal direction. More specifically, on two ends in the longitudinal direction of the first band-shaped region, the line connecting the midpoints in the respective width directions is defined as the third center line, and the direction of the third center line is defined as the third longitudinal direction. The midpoint in the width direction in each end can be determined for, for example, a maximum rectangular band-shaped region virtually formed between the ends of adjacent protrusions. On such an occasion, the above-described direction approximately parallel to the first longitudinal direction is defined such that the third longitudinal direction and the first longitudinal direction are parallel to each other and that the acute angle formed by the third longitudinal direction and the first longitudinal direction is 30° or less.

The longitudinal direction of the second band-shaped region is referred to as the fourth longitudinal direction. More specifically, on two ends in the longitudinal direction of the second band-shaped region, the line connecting the midpoints in the respective width directions is defined as the fourth center line, and the direction of the fourth center line is defined as the fourth longitudinal direction. The above-described direction approximately parallel to the first width direction is defined such that the fourth longitudinal direction and the first width direction are parallel to each other and that the acute angle formed by the fourth longitudinal direction and the first width direction is 30° or less.

In each of the first surface and the second surface of the negative electrode current collector, as needed, for example, another region where no protrusions are disposed may be provided in the innermost winding portion and/or the outermost winding portion. That is, in the negative electrode current collector, a region where no first protrusions and/or second protrusions are formed may be provided in a portion closest to the winding axis of the electrode group and/or a portion farthest from the winding axis of the electrode group. A negative electrode lead for electrically connecting the negative electrode may be connected to the portion where no protrusions are formed on the first surface or the second surface of the negative electrode current collector by, for example, welding.

Figure 2A:
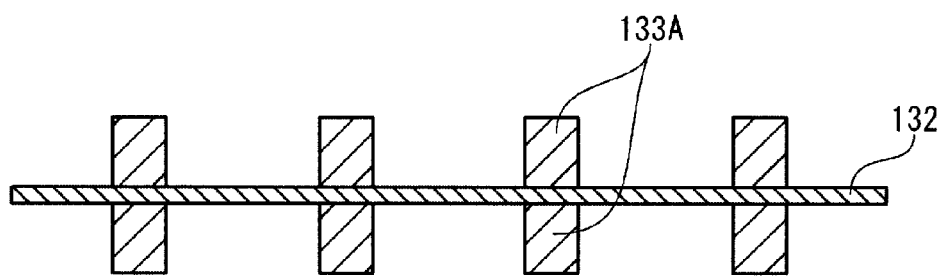
FIG. 2A is a cross-sectional view of the section taken along the line IIA-IIA in FIG. 1 viewed from the direction of the arrow.
Figure 2B:
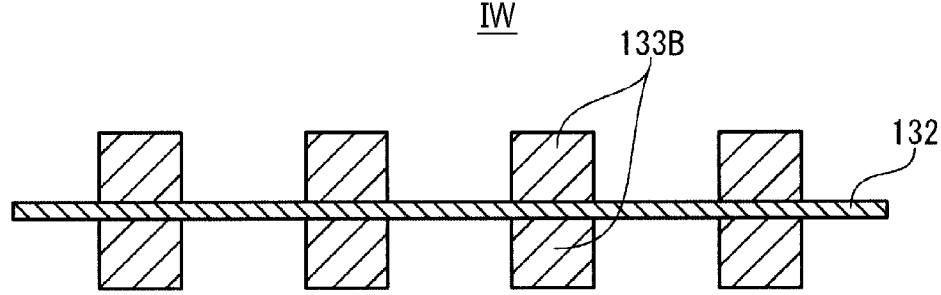
FIG. 2B is a cross-sectional view of the section taken along the line IIB-IIB in FIG. 1 viewed from the direction of the arrow.

FIG. 1 is a plan view schematically illustrating a negative electrode used in a lithium secondary battery according to an embodiment. In FIG. 1, one surface of the negative electrode is shown. FIG. 2A is a cross-sectional view of the section taken along the line IIA-IIA in FIG. 1 viewed from the direction of the arrow. FIG. 2B is a cross-sectional view of the section taken along the line IIB-IIB in FIG. 1 viewed from the direction of the arrow.

The negative electrode 134 includes a negative electrode current collector 132 made of, for example, metal foil, outer-circumference-side protrusions 133A and inner-circumference-side protrusions 133B protruding from the surfaces of the negative electrode current collector 132. The projection shape of each of the protrusions projected on the surface of the negative electrode current collector 132 in the thickness direction of the negative electrode current collector 132 is the same as the shape of the planar view of the protrusions shown in FIG. 1, i.e., a line shape. When the surface of the negative electrode current collector 132 shown in FIG. 1 is the first surface, the protrusions are the first protrusions; and when the surface is the second surface, the protrusions are the second protrusions.

The surface of the negative electrode current collector 132 viewed from the normal direction has a rectangle shape in which the length in the direction perpendicular to the winding axis when the electrode group is formed by winding is longer than the length in the direction parallel to the winding axis. In FIG. 1, on the surface of the negative electrode current collector 132, the direction perpendicular to the winding axis is indicated by the first longitudinal direction LD1, and the direction parallel to the winding axis is indicated by the first width direction WD1.

In FIG. 1, protrusions are provided on the surface of the negative electrode current collector 132 in such a manner that the second longitudinal direction LD2 of each protrusion is parallel to the first longitudinal direction LD1. The negative electrode current collector 132 is divided into a region located in the inner winding portion IW of the electrode group and a region located in the outer winding portion OW by the center line CL dividing the length of the region facing the positive electrode active material of the negative electrode current collector 132 into two parts in the first longitudinal direction LD1.

As shown in FIGS. 2A and 2B, the protrusions provided in the outer winding portion OW have a width narrower than that of the protrusions provided in the inner winding portion IW. Accordingly, the area rate of the outer-circumference-side protrusions 133A to the outer winding portion OW is smaller than the area rate of the inner-circumference-side protrusions 133B to the inner winding portion IW. Consequently, increase of the differences in the density of lithium metal and the surface pressure between the inner winding portion and the outer winding portion of the electrode group can be reduced. Accordingly, the charge-discharge reaction can be more homogeneously performed. The more homogeneous charge-discharge reaction improves the cycle characteristics.

On the surface of the outer winding portion OW, a first band-shaped region 132a where no outer-circumference-side protrusions 133A are formed is provided along the first longitudinal direction LD1. The third longitudinal direction LD3 of the first band-shaped region 132a is parallel to the first longitudinal direction LD1. In addition, in each of the first surface and the second surface of the negative electrode current collector 132, a second band-shaped region 132b where no protrusions are formed is provided at the center line CL and in the vicinity thereof. The fourth longitudinal direction LD4 of the second band-shaped region 132b is parallel to the first width direction WD1. On the surface of the inner winding portion IW, another first band-shaped region 132c where no inner-circumference-side protrusions 133B are formed is provided along the third longitudinal direction LD3 of the first band-shaped region 132a.

The minimum clearance between two adjacent outer-circumference-side protrusions 133A is larger than the maximum width of the two adjacent outer-circumference-side protrusions 133A, and the minimum clearance between two adjacent inner-circumference-side protrusions 133B is larger than the maximum width of the two adjacent inner-circumference-side protrusions 133B.

When a wound electrode group is formed by winding such a negative electrode 134 together with a positive electrode and a separator from the end on the inner winding portion IW side and is used in a lithium secondary battery, a space is formed between the negative electrode current collector 132 and the separator between two adjacent protrusions. The lithium metal deposited by charging is accommodated in this space to reduce expansion of the negative electrode 134.

Figure 3:
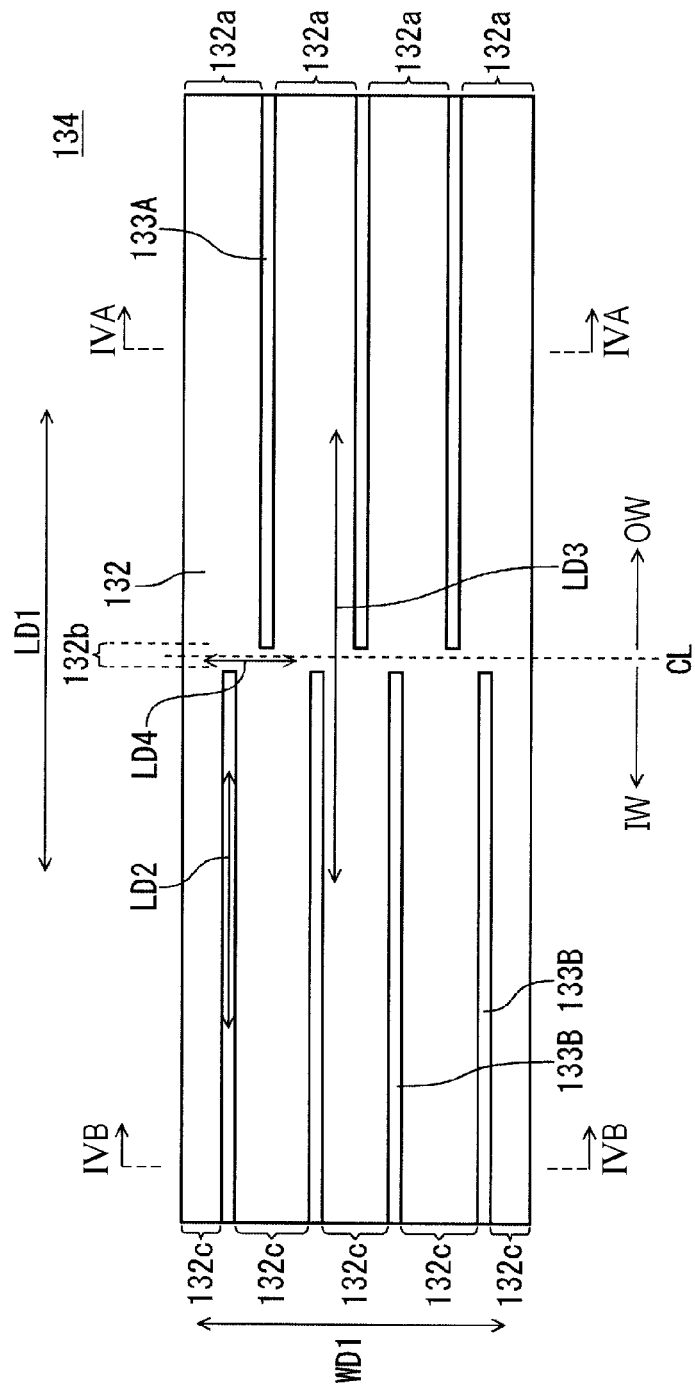
FIG. 3 is a plan view schematically illustrating another negative electrode used in a lithium secondary battery according to an embodiment of the present disclosure.
Figure 4A:
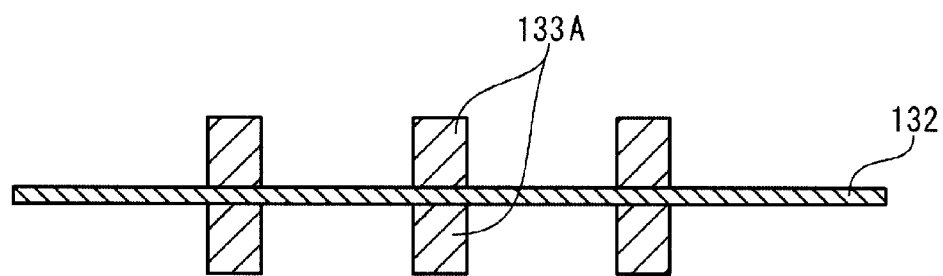
FIG. 4A is a cross-sectional view of the section taken along the line IVA-IVA in FIG. 3 viewed from the direction of the arrow.
Figure 4B:
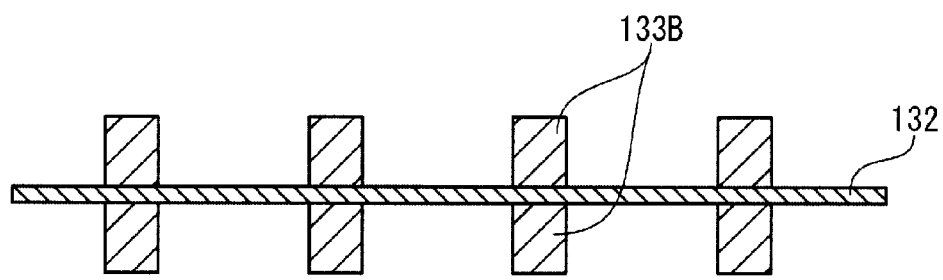
FIG. 4B is a cross-sectional view of the section taken along the line IVB-IVB in FIG. 3 viewed from the direction of the arrow.

FIG. 3 is a plan view schematically illustrating another negative electrode used in a lithium secondary battery according to an embodiment. In FIG. 3, one surface of the negative electrode is shown. FIG. 4A is a cross-sectional view of the section taken along the line IVA-IVA in FIG. 3 viewed from the direction of the arrow. FIG. 4B is a cross-sectional view of the section taken along the line IVB-IVB in FIG. 3 viewed from the direction of the arrow.

As shown in FIGS. 4A and 4B, the width of the outer-circumference-side protrusions 133A provided in the outer winding portion OW and the width of the inner-circumference-side protrusions 133B provided in the inner winding portion IW (i.e., the length in the direction perpendicular to the second longitudinal direction LD2) are the same. The number of the outer-circumference-side protrusions 133A is smaller than that of the inner-circumference-side protrusions 133B. Accordingly, the area rate of the protrusions in the outer winding portion OW is smaller than that of the protrusions in the inner winding portion IW. The negative electrode of FIG. 3 has the same configuration as that of the negative electrode of FIG. 1, excepting the above.

For example, the whole or a part of the characteristics of protrusions, such as projection shapes, height, number, direction, width, and clearance between two adjacent protrusions, are not limited to those shown in FIGS. 1 and 3 and can be modified. These characteristics may be the same or different in the inner winding portion IW and the outer winding portion OW. When the protrusions are formed on both the first surface and the second surface of the negative electrode current collector 132, these characteristics may be the same or different on the first surface side and the second surface side of the negative electrode current collector 132. In such a case, the protrusions disposed on the first surface side (i.e., the first protrusions) and the protrusions disposed on the second surface side (i.e., the second protrusions) may be disposed in a zigzag manner when viewed from the normal direction of the first surface. That is, the protrusions may be disposed in such a manner that one second protrusion is disposed between two adjacent first protrusions.

The negative electrode 134 includes a negative electrode current collector 132 (e.g., a conductive sheet such as metal foil) and protrusions formed on each surface of the conductive sheet. In the wound electrode group, the outer surface and the inner surface of the negative electrode current collector 132 are, respectively, the first surface and the second surface of the negative electrode current collector 132.

The conductive sheet is made of, for example, a conductive material other than lithium metal and lithium alloys. The conductive material may be a metal or a metal material such as an alloy or may be a carbon material. The metal material may be a material that does not react with lithium. Examples of such a material include materials that do not react with lithium metal and/or lithium ions. More specifically, the material may be a material that does not form an alloy and an intermetallic compound with lithium. As the carbon material, for example, graphite preferentially exposing the basal plane can be used. Examples of the metal material include copper (Cu), nickel (Ni), iron (Fe), and alloys containing these metal elements. As the alloy, for example, a copper alloy or stainless steel may be used. From the viewpoint of easily providing a high strength, at least one selected from the group consisting of copper, copper alloys, and stainless steel may be used as the conductive material. From the viewpoint of easily achieving a high capacity and a high charge-discharge efficiency due to its high electrical conductivity, the conductive material may be copper and/or a copper alloy. These conductive materials may be contained in the conductive sheet alone, or two or more thereof may be contained.

As the conductive sheet, for example, foil or film is used, and a sheet made of a carbon material as described above may be used. The conductive sheet may be porous provided that the winding property is not impaired. From the viewpoint of easily securing a high conductivity, the conductive sheet may be metal foil or metal foil containing copper. Such metal foil may be copper foil or copper alloy foil. The content of copper in the metal foil may be 50 mass % or more or 80 mass % or more. In particular, the metal foil may be copper foil containing substantially copper only as the metal element.

Since protrusions are provided on the negative electrode 134, the first surface and the second surface of the negative electrode current collector 132 may be smooth. Consequently, lithium metal tends to be uniformly deposited on the first surface and the second surface of the negative electrode current collector 132 during charging. The term "smooth" means that the maximum height roughness Rz of each of the first surface and the second surface of the negative electrode current collector 132 is 20 μm or less. The maximum height roughness Rz of each of the first surface and the second surface of the negative electrode current collector 132 may be 10 μm or less. The maximum height roughness Rz is measured in accordance with JIS B 0601:2013.

From the viewpoint of easily securing a high volumetric energy density, the negative electrode 134 may include only the negative electrode current collector 132 and the protrusions when the lithium secondary battery is in a fully discharged state. From the viewpoint of easily securing a high charge-discharge efficiency, in a fully discharged state, the negative electrode may include a negative electrode active material layer disposed on the surface of the negative electrode current collector, in addition to the negative electrode current collector 132 and the protrusions.

In the present disclosure, the fully discharged state of a lithium secondary battery is a state obtained by discharging until a state of charge (SOC) of 0.05 C or less, where C denotes the rated capacity of the battery, and is, for example, a state obtained by discharging until the lower limit voltage at a constant current of 0.05 C. The lower limit voltage is 2.5 V, for example.

Examples of the negative electrode active material contained in the negative electrode active material layer include lithium metal, lithium alloys, and materials that reversibly occlude and release lithium ions. The negative electrode active material may be that used in lithium-ion batteries. Examples of the lithium alloy include a lithium aluminum alloy. Examples of the material that reversibly occlude and release lithium ions include carbon materials and alloy materials. The carbon material is, for example, at least one selected from the group consisting of graphite materials, soft carbon, hard carbon, and amorphous carbon. Examples of the alloy material include materials containing silicon and/or tin. The alloy material is, for example, at least one selected from the group consisting of silicon simple substance, silicon alloys, silicon compounds, tin simple substance, tin alloys, and tin compounds. Examples of each of the silicon compound and the tin compound are oxides and/or nitrides.

The negative electrode active material layer may be formed by depositing a negative electrode active material on the surface of the negative electrode current collector by a gas phase method such as electrodeposition or vapor deposition. Alternatively, the negative electrode active material layer may be formed by applying a negative electrode mixture including a negative electrode active material, a binder, and, as needed, one or more components to the surface of the negative electrode current collector. The component used as needed is, for example, at least one selected from the group consisting of a conductive agent, a thickener, and an additive. The negative electrode active material layer may have any thickness, and the thickness is, for example, 1 μm or more and 150 μm or less per one surface of the negative electrode current collector in a fully discharged state of the lithium secondary battery.

The negative electrode active material layer and the protrusions may be formed in any order. The protrusions may be formed after formation of the negative electrode active material layer, or the negative electrode active material layer may be formed after formation of the protrusions. More specifically, protrusions being in direct contact with the first surface and/or the second surface of the negative electrode current collector 132 may protrude from each surface. Alternatively, protrusions may protrude from the first surface and/or the second surface of the negative electrode current collector 132 with the negative electrode active material layer between each surface and the protrusions.

The negative electrode current collector or the conductive sheet may have any thickness, and the thickness is, for example, 5 μm or more and 20 μm or less.

The protrusions may be made of any material. The material of the protrusions may be different from the material of the negative electrode current collector 132. Alternatively, the protrusions and the negative electrode current collector 132 may be integrally made of the same material. The protrusions may be each made of a conductive material and/or an insulating material. The conductive material can be appropriately selected from those mentioned as the material for the conductive sheet. The negative electrode current collector 132 including such protrusions can be prepared by forming the protrusions on the surface of the conductive sheet by, for example, pressing. Alternatively, the negative electrode current collector 132 may be formed by applying coating or sticking tape of the conductive material to the surface of the conductive sheet.

The protrusions may be each made of a resin material. The resin material may be insulative. Deposition of lithium metal on the tips of the protrusions by charging can be reduced by making the protrusions from an insulating material such as a resin material. The deposited lithium metal is accommodated on the negative electrode 134, more preferably, in the space formed in the vicinity of the surface of the negative electrode current collector 132, which is a conductive sheet such as metal foil. Accordingly, the effect of reducing expansion of the negative electrode can be enhanced.

The resin material is, for example, at least one selected from the group consisting of olefin resins, acrylic resins, polyamide resins, polyimide resins, and silicone resins. The resin material may be a cured product of a curable resin, such as an epoxy resin. The protrusions can be formed by, for example, attaching adhesive resin tape to the surface of the negative electrode current collector 132 or to the negative electrode active material layer disposed on the surface of the negative electrode current collector 132. Alternatively, the protrusions may be formed by applying a solution or dispersion containing a resin material onto the surface of the negative electrode current collector 132 or the negative electrode active material layer and drying it. The protrusions also can be formed by applying a curable resin into a desired shape on the surface of the negative electrode current collector 132 and curing it.

The negative electrode 134 can further include a protective layer. The protective layer may be formed on the surface of the negative electrode current collector 132. When the negative electrode 134 includes a negative electrode active material layer, the protective layer may be formed on the surface of the negative electrode active material layer. The protective layer has an effect of making the surface reaction of the electrode more uniform. Accordingly, lithium metal tends to be more uniformly deposited on the negative electrode. The protective layer can be made of, for example, an organic material and/or an inorganic material. As such a material, a material that does not inhibit lithium-ion conductivity is used. Examples of the organic material include lithium-ion conductive polymers. Examples of the inorganic material include ceramics and solid electrolytes.

Lithium Secondary Battery

A structure of the lithium secondary battery will now be more specifically described. The lithium secondary battery includes a wound electrode group and a nonaqueous electrolyte. The wound electrode group is formed by winding a positive electrode, a negative electrode, and a separator disposed between the electrodes.

Figure 5:
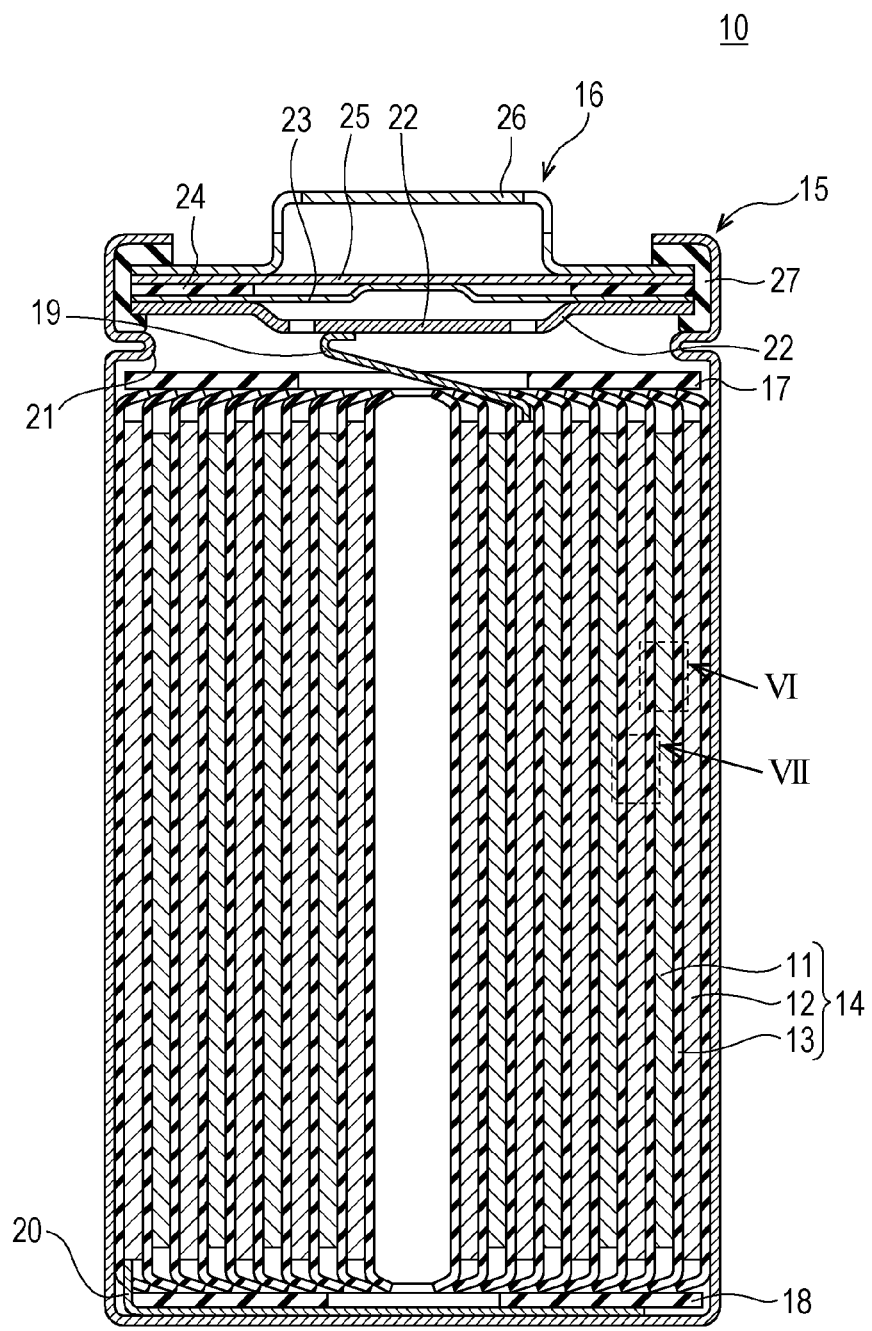
FIG. 5 is a longitudinal cross-sectional view schematically illustrating a lithium secondary battery according to another embodiment of the present disclosure.
Figure 6:
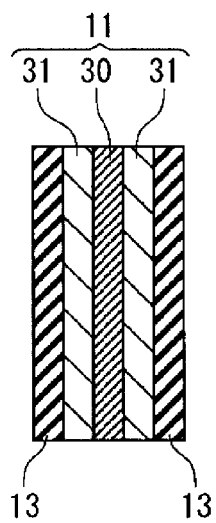
FIG. 6 is an enlarged cross-sectional view schematically illustrating the region indicated by VI in FIG. 5.
Figure 7:
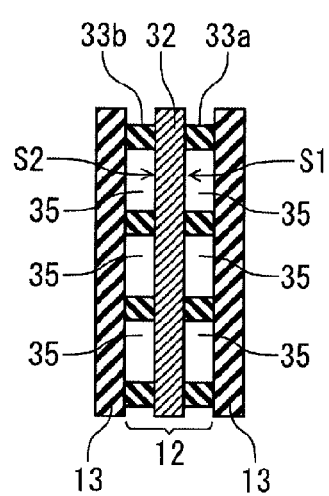
FIG. 7 is an enlarged cross-sectional view schematically illustrating the region indicated by VII in FIG. 5.

FIG. 5 is a longitudinal cross-sectional view schematically illustrating a lithium secondary battery according to an embodiment of the present disclosure. FIG. 6 is an enlarged cross-sectional view schematically illustrating the region indicated by VI in FIG. 5. FIG. 7 is an enlarged cross-sectional view schematically illustrating the region indicated by VII in FIG. 5. FIG. 7 shows a section in a fully discharged state.

The lithium secondary battery 10 is a cylindrical battery including a cylindrical battery case, a wound electrode group 14 accommodated in the battery case, and a nonaqueous electrolyte (not shown). The battery case is composed of a case body 15 which is a bottomed cylindrical metal container and a sealing body 16 which seals the opening of the case body 15. A gasket 27 is disposed between the case body 15 and the sealing body 16 and secures sealability of the battery case. In the case body 15, insulating plates 17, 18 are respectively disposed at both ends of the electrode group 14 in the winding axis direction.

The case body 15 has, for example, a stepped portion 21 formed by partially pressing the side wall of the case body 15 from the outside. The stepped portion 21 may be annularly formed on the side wall of the case body 15 along the circumferential direction of the case body 15. In such a case, the sealing body 16 is supported by the surface of the stepped portion on the opening side.

The sealing body 16 includes a filter 22, a lower valve 23, an insulating member 24, an upper valve 25, and a cap 26. In the sealing body 16, these members are stacked in this order. The sealing body 16 is set to the opening of the case body 15 such that the cap 26 is located outside the case body 15 and the filter 22 is located inside the case body 15. Each member constituting the sealing body 16 has, for example, a disk shape or a ring shape. The members excluding the insulating member 24 are electrically connected to each other.

The electrode group 14 includes a positive electrode 11, a negative electrode 12, and a separator 13. The positive electrode 11, the negative electrode 12, and the separator 13 all have band-like shapes. The positive electrode 11 and the negative electrode 12 are spirally wound with the separator 13 between these electrodes such that the width direction of the band-shaped positive electrode 11 and negative electrode 12 is parallel to the winding axis. In a cross-section perpendicular to the winding axis of the electrode group 14, the positive electrode 11 and the negative electrode 12 are alternately laminated in the radius direction of the electrode group 14 with the separator 13 between these electrodes.

The positive electrode 11 is electrically connected to a cap 26, which also serves as a positive electrode terminal, via a positive electrode lead 19. One end of the positive electrode lead 19 is connected to the positive electrode 11, for example, at the vicinity of the center in the longitudinal direction. The positive electrode lead 19 extending from the positive electrode 11 passes through a through hole (not shown) formed in the insulating plate 17 and reaches the filter 22. The other end of the positive electrode lead 19 is welded to the surface of the filter 22 on the electrode group 14 side.

The negative electrode 12 is electrically connected to the case body 15, which also serves as a negative electrode terminal, via a negative electrode lead 20. One end of the negative electrode lead 20 is connected to, for example, an end of the negative electrode 12 in the longitudinal direction, and the other end is welded to the inner surface of the bottom of the case body 15.

FIG. 6 shows the positive electrode 11 facing the separator 13. FIG. 7 shows the negative electrode 12 facing the separator 13. The positive electrode 11 includes a positive electrode current collector 30 and positive electrode mixture layers 31 disposed on both the first surface and the second surface of the positive electrode current collector 30. The negative electrode 12 includes a negative electrode current collector 32, first protrusions 33a disposed on the first surface S1 of the outer side of the negative electrode current collector 32, and second protrusions 33b disposed on the second surface S2 of the inner side of the negative electrode current collector 32. The first surface S1 and the second surface S2 of the negative electrode current collector 32 are, respectively, the first surface and the second surface of a conductive sheet, such as metal foil, constituting the negative electrode current collector 32. The first protrusions 33a protrude from the first surface S1 toward the surface of the separator 13 facing the first surface S1. The second protrusions 33b protrude from the second surface S2 toward the surface of the separator 13 facing the second surface S2.

The first protrusions 33a and the second protrusions 33b are formed on the first surface S1 and the second surface S2, respectively. A space 35 is formed between the first surface S1 and the separator 13 between two adjacent first protrusions 33a. In addition, a space 35 is formed between the second surface S2 and the separator 13 between two adjacent second protrusions 33b. In the lithium secondary battery 10, lithium metal is deposited in the space 35 by charging, and the deposited lithium metal is dissolved in the nonaqueous electrolyte by discharging. Since the space 35 can accommodate the deposited lithium metal, the change in the apparent volume of the negative electrode 12 by deposition of lithium metal can be decreased. In addition, in the electrode group 14, since a pressure is also applied to the lithium metal accommodated in the space 35, peeling of the lithium metal is reduced. Accordingly, deterioration of the charge-discharge efficiency of the lithium secondary battery 10 can also be reduced.

As the negative electrode 12 including protrusions and the negative electrode current collector 32, the negative electrode 134 including the above-described protrusions and the negative electrode current collector 132 can be used. Accordingly, regarding the negative electrode 12, the protrusions, and the negative electrode current collector 32, the explanation of the negative electrode 134, the protrusions, and the negative electrode current collector 132 above can be referred to. The structure other than the negative electrode 12 of the lithium secondary battery will now be described more specifically.

Positive Electrode 11

The positive electrode 11 includes, for example, a positive electrode current collector 30 and a positive electrode mixture layer 31 formed on the positive electrode current collector 30. The positive electrode mixture layer 31 may be formed on both the first surface and the second surface of the positive electrode current collector 30. The positive electrode mixture layer 31 may be formed one of the surfaces of the positive electrode current collector 30. For example, in the region connected to the positive electrode lead 19 and/or the region not facing the negative electrode 12, the positive electrode mixture layer 31 may be formed on only one surface of the positive electrode current collector 30. For example, in the region of the innermost circumference of the winding and the vicinity thereof and/or the region of the outermost circumference of the winding and the vicinity thereof, a region not facing the negative electrode 12 may be present. Accordingly, in such a region, the positive electrode mixture layer 31 may be formed on only one surface of the positive electrode current collector 30, and the positive electrode mixture layer 31 need not be formed on both the first surface and the second surface.

The positive electrode mixture layer 31 contains a positive electrode active material and can contain a conductive material and/or a binder as optional components. The positive electrode mixture layer 31 may contain an additive as needed. A conductive carbon material may be disposed between the positive electrode current collector 30 and the positive electrode mixture layer 31 as needed.

The positive electrode 11 is prepared by, for example, applying a slurry containing structural components of the positive electrode mixture layer and a dispersion medium to the surface of the positive electrode current collector 30, and drying and then rolling the resulting coating film. A conductive carbon material may be applied onto the surface of the positive electrode current collector 30 as needed. The dispersion medium is, for example, water and/or an organic medium.

The positive electrode active material is, for example, a material that occludes and releases lithium ions. The positive electrode active material is, for example, at least one selected from the group consisting of lithium-containing transition metal oxides, transition metal fluorides, polyanions, fluorinated polyanions, and transition metal sulfides. The positive electrode active material may be a lithium-containing transition metal oxide from the viewpoint of a high average discharge voltage and a cost advantage.

Examples of the transition metal element contained in the lithium-containing transition metal oxide include Sc, Ti, V, Cr, Mn, Fe, Co, Ni, Cu, Y, Zr, and W. The lithium-containing transition metal oxide may contain a single transition metal element or may contain two or more transition metal elements. The transition metal element may be at least one selected from the group consisting of Co, Ni, and Mn. The lithium-containing transition metal oxide can contain one or more typical metal elements as needed. Examples of the typical metal element include Mg, Al, Ca, Zn, Ga, Ge, Sn, Sb, Pb, and Bi. The typical metal element may be, for example, Al.

The conductive material is, for example, a carbon material. Examples of the carbon material include carbon black, carbon nanotubes, and graphite. Examples of the carbon black include acetylene black and Ketjen black. The positive electrode mixture layer 31 may contain one or more conductive materials. At least one material selected from these carbon materials may be used as a conductive carbon material lying between the positive electrode current collector 30 and the positive electrode mixture layer 31.

Examples of the binder include fluororesins, polyacrylonitrile, polyimide resins, acrylic resins, polyolefin resins, and rubber-like polymers. Examples of the fluororesin include polytetrafluoroethylene and polyfluorinated vinylidene. The positive electrode mixture layer 31 may contain a single binder or two or more binders.

Examples of the material of the positive electrode current collector 30 include metal materials containing Al, Ti, Fe, or the like. The metal material may be, for example, Al, an Al alloy, Ti, a Ti alloy, or a Fe alloy. The Fe alloy may be stainless steel. Examples of the positive electrode current collector 30 include foil and film. The positive electrode current collector 30 may be porous. For example, metal mesh may be used as the positive electrode current collector 30.

Separator 13

As the separator 13, a porous sheet having ionic permeability and insulation is used. Examples of the porous sheet include microporous film, woven fabric, and nonwoven fabric. The material of the separator is not particularly limited and may be a polymer material. Examples of the polymer material include olefin resins, polyamide resins, and cellulose. Examples of the olefin resin include polyethylene, polypropylene, and copolymers of ethylene and propylene. The separator 13 may contain an additive as needed. Examples of the additive include inorganic fillers.

The separator 13 may include a plurality of layers having different forms and/or compositions. Such separator 13 may be, for example, a layered product of a polyethylene microporous film and a polypropylene microporous film or a layered product of a nonwoven fabric containing cellulose fibers and a nonwoven fabric containing a thermoplastic resin fibers. Alternatively, the separator 13 may include a coating film formed by applying a polyamide resin to a surface of, for example, microporous film, woven fabric, or nonwoven fabric. Such separator 13 shows high durability even if a pressure is applied to the separator 13 in a state being in contact with protrusions. In addition, from the viewpoint of securing heat resistance and/or strength, the separator 13 may include a layer containing an inorganic filler on the side facing the positive electrode 11 and/or the side facing the negative electrode 12.

Nonaqueous Electrolyte

The nonaqueous electrolyte to be used has lithium-ion conductivity. Such a nonaqueous electrolyte includes a nonaqueous solvent and lithium ions and anions dissolved in the nonaqueous solvent. The nonaqueous electrolyte may be in a liquid form or may be in a gel form. The nonaqueous electrolyte may be a solid electrolyte.

The nonaqueous electrolyte in a liquid form is prepared by dissolving a lithium salt in a nonaqueous solvent. Lithium ions and anions are generated by that the lithium salt is dissolved in the nonaqueous solvent. The nonaqueous electrolyte may contain an undissociated lithium salt. As the lithium salt, a salt of a lithium ion and an anion is used.

The nonaqueous electrolyte in a gel form include a liquid nonaqueous electrolyte and a matrix polymer. The matrix polymer to be used is, for example, a polymer material that absorbs a nonaqueous solvent and thereby gels. Such a polymer material is, for example, at least one selected from the group consisting of fluororesins, acrylic resins, and polyether resins.

As the lithium salt and the anion, known lithium salts and anions that are used for nonaqueous electrolytes of lithium secondary batteries can be used. Examples of the anion include $BF_4^-$, $ClO_4^-$, $PF_6^-$, $CF_3SO_3^-$, $CF_3CO_2^-$, anions of imides, and anions of oxalates. Examples of the anion of an imide include $N(SO_2C_mF_{2m+1})(SO_2C_nF_{2n+1})^-$ (where m and n are each independently an integer of 0 or more). In the formula, m and n may be each 0 to 3 or may be each 0, 1, or 2. The anion of an imide may be $N(SO_2CF_3)_2^-$, $N(SO_2C_2F_5)_2^-$, or $N(SO_2F)_2^-$. The anion of an oxalate may contain boron and/or phosphorus. The anion of an oxalate may be an anion of an oxalate complex. Examples of the anion of an oxalate include bis(oxalate)borate anions, $BF_2(C_2O_4)^-$, $PF_4(C_2O_4)^-$, and $PF_2(C_2O_4)_2^-$. The nonaqueous electrolyte may include a single type or two or more types of these anions.

From the viewpoint of reducing deposition of lithium metal in a dendrite form, the nonaqueous electrolyte may include at least one type selected from the group consisting of $PF_6^-$, anions of imides, and anions of oxalates. In particular, by using a nonaqueous electrolyte containing anions of an oxalate, fine particles of lithium metal tend to be evenly deposited due to interaction between the anions of the oxalate and lithium. Accordingly, it is possible to reduce uneven expansion of the negative electrode due to local deposition of lithium metal. A combination of anions of an oxalate complex and other anions may be used. Such other anions may be $PF_6^-$ and/or anions of imides.

Examples of the nonaqueous solvent include esters, ethers, nitriles, amides, and halogen-substituted products thereof. The nonaqueous electrolyte may include one of these nonaqueous solvents or two or more nonaqueous solvents. Examples of the halogen-substituted product include fluorides.

Examples of the ester include carbonates and carboxylates. Examples of cyclic carbonate include ethylene carbonate, propylene carbonate, and fluoroethylene carbonate. Examples of chain carbonate include dimethyl carbonate, ethyl methyl carbonate, and diethyl carbonate. Examples of cyclic carboxylate include γ-butyrolactone and γ-valerolactone. Examples of chain carboxylate include ethyl acetate, methyl propionate, and methyl fluoropropionate.

Examples of the ether include cyclic ethers and chain ethers. Examples of the cyclic ether include 1,3-dioxolane, 4-methyl-1,3-dioxolane, tetrahydrofuran, and 2-methyltetrahydrofuran. Examples of the chain ether include 1,2-dimethoxyethane, diethyl ether, ethyl vinyl ether, methyl phenyl ether, benzyl ethyl ether, diphenyl ether, dibenzyl ether, 1,2-diethoxyethane, and diethylene glycol dimethyl ether.

Examples of the nitrile include acetonitrile, propionitrile, and benzonitrile. Example of the amide include dimethylformamide and dimethylacetamide.

The concentration of the lithium salt in the nonaqueous electrolyte is, for example, 0.5 mol/L or more and 3.5 mol/L or less. Here, the concentration of a lithium salt is the sum of the concentration of dissociated lithium salt and the concentration of undissociated lithium salt. The concentration of anions in the nonaqueous electrolyte may be 0.5 mol/L or more and 3.5 mol/L or less.

The nonaqueous electrolyte may contain an additive. The additive may form a coating film on the negative electrode. Generation of dendrites tends to be reduced by formation of a coating film of the additive on the negative electrode. Examples of the additive include vinylene carbonate, fluoroethylene carbonate, and vinyl ethylene carbonate. These additives may be used alone or in combination of two or more thereof.

Others

In the examples shown in the drawings, cylindrical lithium secondary batteries have been described, but the battery is not limited thereto, and the present embodiment can also be applied to lithium secondary batteries including a wound electrode group of which the shape of the end face in the winding axis direction is elliptic or oval. Regarding the structures other than the electrode group and the nonaqueous electrolyte of the lithium secondary battery, any known structures can be used without specific limitations.

EXAMPLES

The lithium secondary battery according to the present disclosure will now be specifically described based on Examples and Comparative Examples. The present disclosure is not limited to the following Examples.

Example 1

(1) Production of Positive Electrode

A positive electrode active material, acetylene black as a conductive material, and polyfluorinated vinylidene as a binder were mixed at a mass ratio of 95:2.5:2.5. An appropriate amount of N-methyl-2-pyrrolidone as a dispersion medium was added to the mixture, followed by stirring to prepare a positive electrode mixture slurry. The positive electrode active material used was a lithium-containing transition metal oxide containing Ni, Co, and Al.

The positive electrode mixture slurry was applied to both surfaces of aluminum foil as a positive electrode current collector and was then dried. The dried product was compressed in the thickness direction with a roller. The resulting layered product was cut into a predetermined electrode size to produce a positive electrode provided with a positive electrode mixture layer on both surfaces of the positive electrode current collector. An exposed portion of the positive electrode current collector not provided with the positive electrode mixture layer was formed in a partial region of the positive electrode. One end of an aluminum positive electrode lead was attached to the exposed portion of the positive electrode current collector by welding.

(2) Production of Negative Electrode

A negative electrode 134 including outer-circumference-side protrusions 133A and inner-circumference-side protrusions 133B on a negative electrode current collector 132 was produced by the following procedure. An electrolytic copper foil having a thickness of 10 μm was used as a negative electrode current collector 132, and a polyethylene adhesive tape was attached to both the first surface and the second surface of the negative electrode current collector 132 to form a plurality of line-shaped protrusions. More specifically, according to the case shown in FIGS. 1, 2A, and 2B, on each of the first surface and the second surface of the negative electrode current collector 132, an adhesive tape having a thickness of 50 μm and a width of 1 mm was attached to the region becoming the outer winding portion OW of the electrode group, and an adhesive tape having a thickness of 50 μm and a width of 2 mm was attached to the region becoming the inner winding portion IW. On this occasion, the adhesive tapes were attached such that the longitudinal direction of the adhesive tapes was parallel to the first longitudinal direction LD1 of the negative electrode current collector 132.

On each of the first surface and the second surface of the negative electrode current collector 132, the minimum value of the center-to-center distance of two adjacent outer-circumference-side protrusions 133A disposed on the outer winding portion OW was about 5 mm. The first area rate of the outer-circumference-side protrusions 133A was 20% (=(adhesive tape width: 1 mm/center-to-center distance: 5 mm)×100).

On each of the first surface and the second surface of the negative electrode current collector 132, the minimum value of the center-to-center distance of two adjacent inner-circumference-side protrusions 133B disposed on the inner winding portion IW was about 5 mm. The second area rate of the inner-circumference-side protrusions 133B was 40% (=(adhesive tape width: 2 mm/center-to-center distance: 5 mm)×100). The first average height of the outer-circumference-side protrusions 133A and the second average height of the inner-circumference-side protrusions 133B were both 50 μm.

The resulting product was cut into a predetermined electrode size to form a negative electrode 134 provided with a plurality of line-shaped protrusions on each of the first surface and the second surface of the negative electrode current collector 132. One end of a nickel negative electrode lead was attached to the negative electrode 134 by welding.

(3) Preparation of Nonaqueous Electrolyte

Ethylene carbonate and dimethyl carbonate were mixed at a volume ratio of 3:7. $LiPF_6$ and $LiBF_2(C_2O_4)_2$ were dissolved in the resulting solvent mixture at concentrations of 1 mol/L and 0.1 mol/L, respectively, to prepare a liquid nonaqueous electrolyte.

(4) Production of Battery

In an inert gas atmosphere, the positive electrode prepared as described in (1) and the negative electrode 134 prepared as described in (2) were stacked with a polyethylene microporous film as a separator therebetween. More specifically, a positive electrode, a separator, a negative electrode 134, and a separator were stacked in this order. The resulting layered product was spirally wound to produce an electrode group. On this occasion, the layered product was wound so that the region of the negative electrode 134 where the protrusions having a width of 2 mm were formed was the inner winding portion IW of the electrode group. In the resulting electrode group, approximately 100% of the upper surfaces of the protrusions were in contact with the separator. The electrode group was accommodated in a bag-like exterior body formed from a laminate sheet including an Al layer, the nonaqueous electrolyte was poured in the exterior body accommodating the electrode group, and the exterior body was then sealed. A lithium secondary battery T1 was thus produced.

Example 2

According to the case shown in FIGS. 3, 4A, and 4B, on each of the first surface and the second surface of the negative electrode current collector 132, an adhesive tape having a thickness of 50 μm and a width of 1 mm was attached to the regions becoming the outer winding portion OW and the inner winding portion IW of the electrode group. Here, the minimum value of the center-to-center distance of two adjacent outer-circumference-side protrusions 133A disposed on the outer winding portion OW was set to be about 8.5 mm. The minimum value of the center-to-center distance of two adjacent inner-circumference-side protrusions 133B disposed on the inner winding portion IW was set to be about 5 mm. A lithium secondary battery T2 was produced as in Example 1, excepting the above.

The first area rate of the outer-circumference-side protrusions 133A was 11.8% (=(adhesive tape width: 1 mm/center-to-center distance: 8.5 mm)×100). The second area rate of the inner-circumference-side protrusions 133B was 20% (=(adhesive tape width: 1 mm/center-to-center distance: 5 mm)×100).

Comparative Example 1

A lithium secondary battery R1 was produced as in Example 1 except that the negative electrode was produced by forming continuous protrusions extending from one end to the other end of metal foil in the longitudinal direction by a polyethylene adhesive tape having a thickness of 50 μm and a width of 1 mm on both surfaces of the metal foil. The minimum value of the center-to-center distance of the protrusions was about 5 mm.

Comparative Example 2

A negative electrode formed as in Example 1 was used. However, the electrode group was produced by winding the layered product in such a manner that the outer winding portion OW of the electrode group was the region of the negative electrode provided with protrusions having a width of 2 mm and that the inner winding portion IW of the electrode group was the region provided with protrusions having a width of 1 mm. A lithium secondary battery R2 was produced as in Example 1 excepting the above.

Comparative Example 3

A negative electrode formed as in Example 2 was used. However, the electrode group was produced by winding the layered product in such a manner that the outer winding portion OW of the electrode group was the region of the negative electrode on which protrusions were disposed such that the minimum value of the center-to-center distance was about 5 mm and that the inner winding portion IW of the electrode group was the region of the negative electrode on which protrusions were disposed such that the minimum value of the center-to-center distance was about 8.5 mm. A lithium secondary battery R3 was produced as in Example 2 excepting the above.

Evaluation

The lithium secondary batteries prepared in Examples and Comparative Examples were subjected to a charge discharge test by the following procedure to evaluate expansion of the negative electrodes. The lithium secondary batteries were charged in a thermostatic chamber of 25° C. under the conditions described below, the charging was then paused for 20 minutes, and the batteries were discharged under the conditions described below.

Charging

Constant-current charging was performed with a current of 10 mA per unit area (unit: square centimeter) of the electrode until the battery voltage reached 4.3 V, and constant-voltage charging was then performed with a voltage of 4.3 V until the current value per unit area (unit: square centimeter) of the electrode reached 1 mA.

Discharging

Constant-current discharging was performed with a current of 10 mA per unit area (unit: square centimeter) of the electrode until the battery voltage reached 2.5 V.

The above-described charging and discharging operation was defined as one cycle, and a 10-cycle charge-discharge test was performed. The rate of the discharge capacity at the 10th cycle to the discharge capacity at the first cycle was determined as the capacity retention rate (%) and was used as an indicator of cycle characteristics.

The results of Examples and Comparative Examples are shown in Table 1. Table 1 collectively shows the first area rate of protrusions formed on the negative electrode to the outer winding portion OW of the electrode group and the second area rate of protrusions to the inner winding portion IW.

TABLE 1

| | First area rate (%) | Second area rate (%) | Capacity retention rate (%) |
|---|---|---|---|
| T1 | 20 | 40 | 96.6 |
| T2 | 11.8 | 20 | 97.3 |
| R1 | 20 | 20 | 94.6 |
| R2 | 40 | 20 | 93.9 |
| R3 | 20 | 11.8 | 94.2 |

As shown in Table 1, high cycle characteristics were obtained in batteries T1 and T2 of Examples compared to batteries R1 to R3 of Comparative Examples. The difference between Examples and Comparative Examples is only the area rate correlation between the protrusions in each winding portion. In these batteries, a slight difference in the area rate of protrusions causes a significant difference in the capacity retention rate between Comparative Examples and Examples. It is conceived that in Examples, since the area rate of the protrusions provided in the outer winding portion OW of the electrode group was small, the difference in the density of deposited lithium metal and the difference in the surface pressure were small to make the charge-discharge reaction more homogeneous.

The lithium secondary battery according to the present disclosure has excellent cycle characteristics. Accordingly, the lithium secondary battery according to the present disclosure is useful for various applications, for example, electronic devices, such as mobile phones, smart phones, and tablet terminals; electric vehicles including hybrids and plug-in hybrids; and household storage batteries combined with solar batteries.

What is claimed is:
1. A lithium secondary battery comprising:
a nonaqueous electrolyte having lithium-ion conductivity; and
an electrode group including:

a positive electrode containing a positive electrode active material containing lithium;

a negative electrode including a negative electrode current collector and protrusions disposed on the negative electrode current collector; and a separator disposed between the positive electrode and the negative electrode, wherein:

the positive electrode, the negative electrode, and the separator of the electrode group are wound, lithium metal is deposited on the negative electrode during charging, and the lithium metal is dissolved in the nonaqueous electrolyte during discharging, the negative electrode current collector has a first surface facing outward of the winding of the electrode group and a second surface facing inward of the winding of the electrode group, one of the first surface or the second surface includes a first region and a second region that is closer to an innermost circumference of the winding of the electrode group than the first region, the protrusions include outer-circumference-side protrusions disposed on the first region and inner-circumference-side protrusions disposed on the second region, in the one of the first surface or the second surface including the first region and the second region, a first area rate is smaller than a second area rate, where the first area rate refers to $(A_{OP}/A_O) \times 100\%$, $A_{OP}$ refers to a sum of the projection areas of the outer-circumference-side protrusions onto the first region, $A_O$ refers to an area of the first region, the second area rate refers to $(A_{IP}/A_I) \times 100\%$, $A_{IP}$ refers to a sum of the projection areas of the inner-circumference-side protrusions onto the second region, and $A_I$ refers to an area of the second region, the projection shapes of the outer-circumference-side protrusions onto the first region are line shapes along a direction perpendicular to the winding axis of the electrode group, and the projection shapes of the inner-circumference-side protrusions onto the second region are line shapes along a direction perpendicular to the winding axis of the electrode group.

2. The lithium secondary battery according to claim 1, wherein:

in the one of the first surface or the second surface, the first region is farther from the innermost circumference than a center line in a longitudinal direction of the first surface or the second surface, and in the one of the first surface or the second surface, the second region is closer to the innermost circumference than the center line of the first surface or the second surface.

3. The lithium secondary battery according to claim 1, wherein a difference between the first area rate and the second area rate is 3 percentage points or more and 50 percentage points or less.

4. The lithium secondary battery according to claim 1, wherein the first area rate is 0.2% or more and 70% or less.

5. The lithium secondary batter according to claim 1, wherein a difference between a first average height of the outer-circumference-side protrusions and a second average height of the inner-circumference-side protrusions is less than 3% of the second average height.

6. The lithium secondary battery according to claim 1, wherein:

a first average height of the outer-circumference-side protrusions is 15 µm or more and 120 µm or less, and the second average height of the inner-circumference-side protrusions is 15 µm or more and 120 µm or less.

7. The lithium secondary battery according to claim 1, wherein:

in the one of the first surface or the second surface, projection shapes of the outer-circumference-side protrusions onto the first region are line shapes, in the one of the first surface or the second surface, projection shapes of the inner-circumference-side protrusions onto the second region are line shapes, in the one of the first surface or the second surface, a minimum clearance between two adjacent outer-circumference-side protrusions out of the outer-circumference-side protrusions is larger than a maximum width of the two adjacent outer-circumference-side protrusions, and in the one of the first surface or the second surface, a minimum clearance between two adjacent inner-circumference-side protrusions out of the inner-circumference-side protrusions is larger than a maximum width of the two adjacent inner-circumference-side protrusions.

8. The lithium secondary battery according to claim 1, wherein the negative electrode current collector includes copper foil or copper alloy foil.

9. The lithium secondary battery according to claim 1, wherein:

the protrusions are in contact with the separator, and the lithium metal is deposited in a space between the negative electrode current collector and the separator during charging.

10. The lithium secondary battery according to claim 1, wherein the protrusions are made of a material different from a material of the negative electrode current collector.

11. The lithium secondary battery according to claim 1, the protrusions are made of a resin material.

12. The lithium secondary battery according to claim 1, wherein a negative electrode current collector and the protrusions are integrally made of the same material.

13. The lithium secondary battery according to claim 1, wherein:

another of the first surface or the second surface includes the first and second regions, the outer-circumference-side protrusions include first protrusions disposed on the first surface and second protrusions disposed on the second surface, and the inner-circumference-side protrusions include first protrusions disposed on the first surface and second protrusions disposed on the second surface.

14. The lithium secondary battery according to claim 13, wherein a difference between an average height of the first protrusions of the outer-circumference-side protrusions and/or the inner-circumference-side protrusions and an average height of the second protrusions of the outer-circumference-side protrusions and/or the inner-circumference-side protrusions is less than 3% of the average height of the second protrusions.

15. The lithium secondary battery according to claim 1, wherein:

the nonaqueous electrolyte includes lithium ions and anions, and the anions include at least one type of anion selected from the group consisting of $PF_6^-$, anions of imides, and anions of oxalates.

16. The lithium secondary battery according to claim 1, wherein (i) a width of the projection shapes of the outer-circumference-side protrusions onto the first region is less than a width of the projection shapes of the inner-circumference-side protrusions onto the second region or
(ii) the number of the outer-circumference-side protrusions in the first region is less than the number of the inner-circumference-side protrusions in the second region.

17. A lithium secondary battery comprising:
a nonaqueous electrolyte having lithium-ion conductivity; and
an electrode group including:
a positive electrode containing a positive electrode active material containing lithium;
a negative electrode including a negative electrode current collector and protrusions disposed on the negative electrode current collector; and
a separator disposed between the positive electrode and the negative electrode,
wherein:
the positive electrode, the negative electrode, and the separator of the electrode group are wound,
lithium metal is deposited on the negative electrode during charging, and the lithium metal is dissolved in the nonaqueous electrolyte during discharging,
the negative electrode current collector has a first surface facing outward of the winding of the electrode group and a second surface facing inward of the winding of the electrode group,
the first surface and the second surface each include a first region and a second region that is closer to an innermost circumference of the winding of the electrode group than the first region,
the protrusions include outer-circumference-side protrusions disposed on the first region and inner-circumference-side protrusions disposed on the second region, and
a first area rate is smaller than a second area rate, where the first area rate refers to an arithmetic mean of a third area rate and a fourth area rate,
the third area rate refers to $(A_{O1P}/A_{O1}) \times 100\%$,
$A_{O1P}$ refers to a sum of projection areas of the outer-circumference-side protrusions in the first surface onto the first region,
$A_{O1}$ refers to an area of the first region in the first surface,
the fourth area rate refers to $(A_{O2P}/A_{O2}) \times 100\%$,
$A_{O2P}$ refers to a sum of projection areas of the outer-circumference-side protrusions in the second surface onto the first region,
$A_{O2}$ refers to an area of the first region in the second surface,
the second area rate refers to an arithmetic mean of a fifth area rate and a sixth area rate,
the fifth area rate refers to $(A_{I1P}/A_{I1}) \times 100\%$,
$A_{I1P}$ refers to a sum of projection areas of the inner-circumference-side protrusions in the first surface onto the second region,
$A_{I1}$ refers to an area of the second region in the first surface,
the sixth area rate refers $(A_{I2P}/A_{I2}) \times 100\%$,
$A_{I2P}$ refers to a sum of projection areas of the inner-circumference-side protrusions in the second surface onto the second region,
$A_{I2}$ refers to an area of the second region in the second surface,
projection shapes of the outer-circumference-side protrusions onto the first region are line shapes along a direction perpendicular to a winding axis of the electrode group, and
projection shapes of the inner-circumference-side protrusions onto the second region are line shapes along a direction perpendicular to a winding axis of the electrode group.

* * * * *